Nov. 6, 1934.                F. L. CONE                 1,979,366
                    WORK HOLDING AND FEEDING MECHANISM
                       Original Filed June 29, 1931
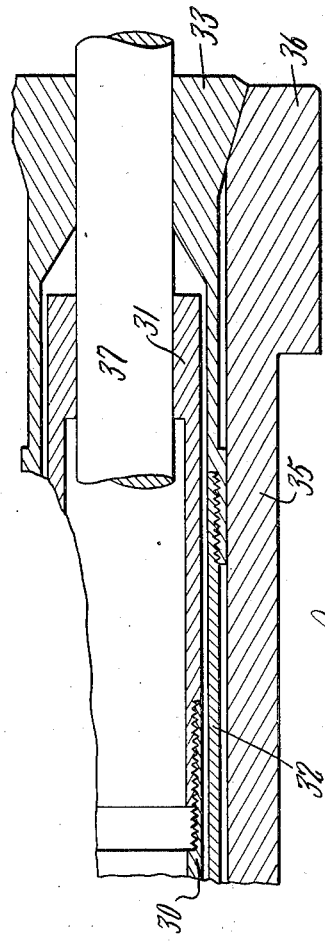
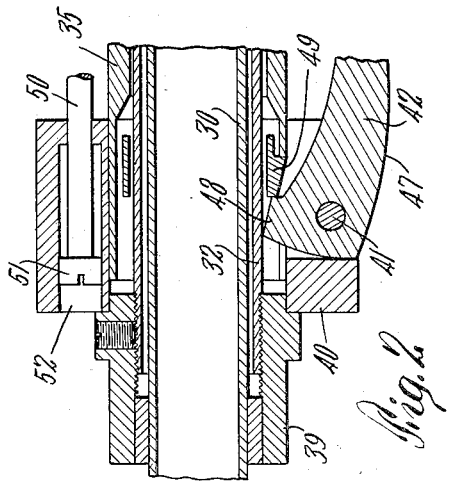
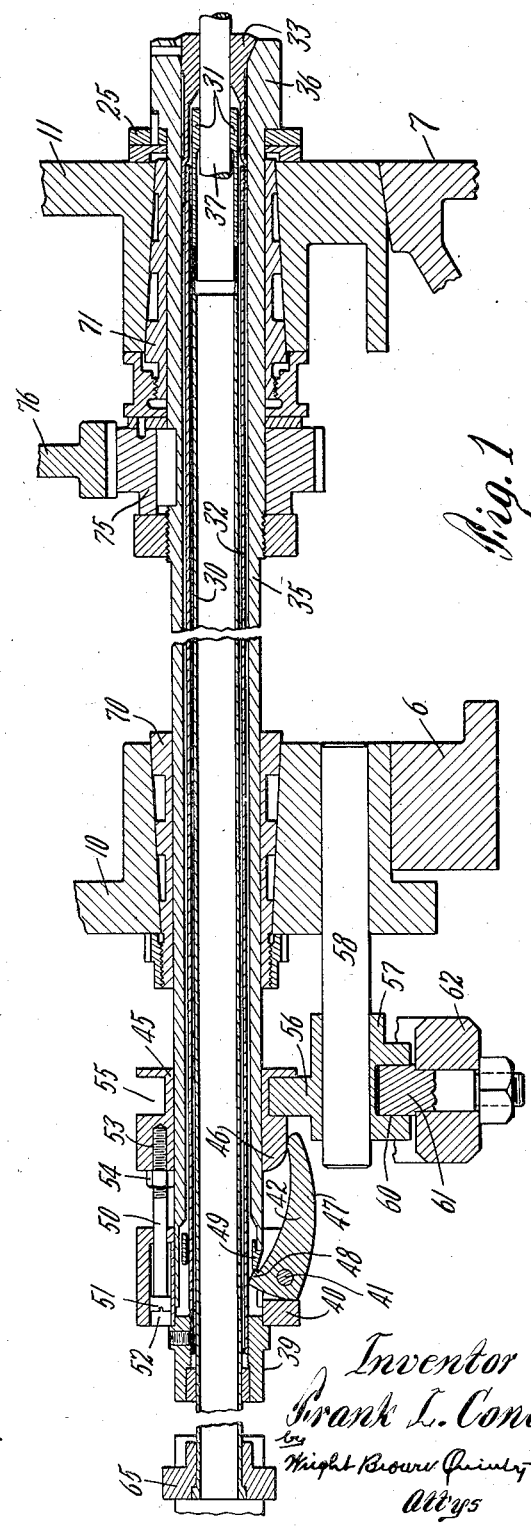
Inventor
Frank L. Cone Patented Nov. 6, 1934

1,979,366

UNITED STATES PATENT OFFICE 1,979,366

WORK HOLDING AND FEEDING MECHANISM

Frank L. Cone, Windsor, Vt.

Original application June 29, 1931, Serial No. 547,544. Divided and this application November 8, 1932, Serial No. 641,731

1 Claim. (Cl. 279—51)

This invention relates to mechanism for holding and feeding bar stock, as, for example, in an automatic lathe screw machine or the like, and has for an object to provide positive work-releasing action not dependent on springs.

This application is a division of my application Serial No. 547,544, for Multiple spindle automatic lathe filed June 29, 1931.

For a more complete understanding of this invention, reference may be had to the accompanying drawing in which Figure 1 is a detail section through a work spindle and related parts of a multiple spindle automatic lathe embodying this invention.

Figures 2 and 3 are similar to portions of Figure 1 but on a larger scale.

The invention is herein illustrated as embodied in a multiple spindle automatic lathe, though it should be understood that it is not limited to any particular machine. In the machine illustrated a plurality of work holders or spindles are arranged in circular series about the axis of a supporting drum which is indexed to bring the holders or spindles successively into each of a plurality of positions in some of which operations are performed on the work and in one or more of which the work is fed forwardly to begin a new machine cycle after the portion of the work previously operated upon has had all machining operations of the machine cycle performed thereon and has been cut off.

As shown in the drawing, the work holder comprises an inner stock feeding tube having a stock gripper 31 at its forward end outwardly of the drum plate 11, a collet carrying tube 32 outwardly of the stock feed tube and carrying a spring collet 33 at its outer end, and an outer tube or work spindle 35 having a collet hood 36 at its forward end with which the collet 33 cooperates when pulled rearwardly to grip the bar stock shown at 37. By moving the collet rearwardly or to the left as shown in the drawing, the work is clamped, the spring fingers of the collet being brought together through their engagement with the collet hood, and by moving the collet in the opposite direction, or to the right, the work is released. The collet is shown in work-gripping position and the work feeder is at the limit of its work feeding movement. Rearwardly or to the left of the drum end 10 the collet tube has fixed thereto a sleeve 39 forming an abutment for a block 40 to which are fulcrumed as at 41 levers such as 42, preferably there being three such levers equally angularly spaced about the axis of the tubes. Axially slidable on the hood tube or work spindle 35 is a collar 45 having at one end a cam face 46 which may be moved in under a relatively long arm 47 of each lever 42 extending in general parallel to the axis of the tubes and by engagement with which these lever arms are rocked outwardly to bring their inner short arms 48 into contact with a ring wear piece 49 at the end of the work spindle. This causes the block 40 to be forced rearwardly away from the adjacent end of the work spindle 35, thus drawing the collet rearwardly and tightening it upon the stock 37. The collar 45 has, however, a lost motion positive connection with the block 40, this, as shown, being formed by rods 50 positioned anguarly between the levers 42 formed as screws having their heads 51 riding in sockets 52 in the block 40 and having their threaded ends 53 engaged in suitable threaded sockets in the collar 45. A lock nut 54 on each of these screws may be used to fix the screw in desired axial position so that at the limit of its lost motion, which is beyond the range of motion where the multiplying wedge connection from the lever arms 42 and the cam face 46 is effective, its head 51 acting as a stop engages on the base of the socket 52 as the collar 45 is moved to the right, further motion causing the block 40 to be moved therewith and this moving the collet 32 positively to the right with relation to the collet hood and permitting its spring fingers to free themselves from the stock. The engagement of the lever arm 48 on the member 49 carried by the spindle also causes this motion to positively swing the lever arms 42 inwardly against the effect of centrifugal force which might otherwise prevent the freeing of the collet. As shown the collar 45 is provided with a peripheral groove 55 in which is engaged a finger 56 on a slide 57 carried on a boss 58 extending rearwardly from the drum end plate 10. This block or slide 57 is provided at its opposite side from the tongue 56 with a groove 60 in which at suitable times in the indexing motion of the drum a shoe 61 on an actuating arm 62 may be engaged as fully described in the parent application hereinbefore mentioned to positively control the position of the collar 45.

The stock feeding tube 30 extends beyond the block 40 and has fixed thereto a head 65 by which it may be actuated at suitable times as is also fully described in the parent application. Each spindle tube 35 is journaled for rotation in bearings 70 and 71 in the drum plates 10 and 11 and adjacent to the drum plate 11 each of these spindles has fixed thereto a gear 75, all these gears meshing with a central gear 76. Thus by rotation of the gear 76 all of the work holders comprising the concentric tubes carrying the collet hood, the collet and the work feed may be rotated, thus to rotate the bar stock as it is presented to the tools.

From the foregoing description of an embodiment of this invention, it should be evident to those skilled in the art that various changes and modifications may be made without departing from the spirit or scope of this invention.

I claim:

In a machine of the class described, a tube, a collet hood carried by one end of said tube, a tube slidable within said collet hood tube and having a spring collet cooperating with said hood, a block element fixed to the opposite end of said collet tube, a lever fulcrumed on said block and having an arm in cooperative engagement with the rear end of said collet hood tube and another arm extending axially of said tubes, a sleeve element slidable axially of said hood tube and having a cam portion engageable with the inner face of said axially extending arm to rock said engaged arm outwardly and said other arm against said collet hood tube to thereby retract said collet and grip the work on movement of said collar in one direction, rods extending between said collar and block elements and secured at one end to one of said elements and slidable relative to the other of said elements, stops on said rods for positively limiting a lost motion connection between said collar and block to cause motion of said collar in a direction opposite to its collet gripping motion after said lost motion is taken up to free said collet from said hood to release the work, and means for moving said collar.

FRANK L. CONE.